US011719367B2

(12) United States Patent
Mitchell et al.

(10) Patent No.: US 11,719,367 B2
(45) Date of Patent: Aug. 8, 2023

(54) END RING ASSEMBLY

(71) Applicant: Mueller International, LLC, Atlanta, GA (US)

(72) Inventors: Timothy J. Mitchell, Hixson, TN (US); Curtis Michael McCullough, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/573,972

(22) Filed: Jan. 12, 2022

(65) Prior Publication Data

US 2022/0136631 A1 May 5, 2022

Related U.S. Application Data

(62) Division of application No. 16/181,741, filed on Nov. 6, 2018, now Pat. No. 11,255,473.

(51) Int. Cl.
*F16L 21/08* (2006.01)
*F16L 21/02* (2006.01)

(52) U.S. Cl.
CPC ............... *F16L 21/08* (2013.01); *F16L 21/02* (2013.01)

(58) Field of Classification Search
CPC . F16L 21/08; F16L 21/02; F16L 17/04; F16L 25/12; F16B 2/065; F16B 2/08; F16B 7/0426
See application file for complete search history.

(56) References Cited

U.S. PATENT DOCUMENTS

| | | |
|---|---|---|
| 3,700,008 A | 10/1972 | Hackman |
| 4,664,428 A | 5/1987 | Bridges |
| RE33,639 E | 7/1991 | Oetiker |
| 5,076,618 A | 12/1991 | Bridge |
| 5,431,458 A | 7/1995 | Schaub et al. |
| 5,765,876 A | 6/1998 | Bridges |
| 5,769,467 A | 6/1998 | Bridges |
| 8,020,898 B2 | 9/2011 | Ignaczak |
| 8,528,945 B2 * | 9/2013 | Bird .................. F16L 21/04 285/369 |
| 8,864,181 B2 | 10/2014 | Bird et al. |

(Continued)

OTHER PUBLICATIONS

Mitchell, Timothy J.; Non-Final Office Action for U.S. Appl. No. 16/181,741, filed Nov. 6, 2018, dated Jan. 21, 2021, 10 pgs.

(Continued)

*Primary Examiner* — James M Hewitt, II
(74) *Attorney, Agent, or Firm* — Taylor English Duma LLP (57) ABSTRACT

An end ring assembly includes a split ring defining an outer ring surface, an inner ring surface, a first ring end and a second ring end, the first ring end and second ring end defining a gap therebetween; a gasket bridge defining an outer bridge surface, an inner bridge surface, the gasket bridge further defining a first bridge end, a second bridge end, and a middle portion therebetween, the middle portion of the gasket bridge extending between the first ring end and the second ring end, the first bridge end and second bridge end engaging the inner ring surface, a first ramp extending from the first bridge end; and a primary gasket defining a primary outer sealing surface and a primary inner sealing surface, the primary outer sealing surface engaging the inner ring surface and the inner bridge surface.

20 Claims, 9 Drawing Sheets

(56) References Cited

U.S. PATENT DOCUMENTS

| | | |
|---|---|---|
| 8,960,729 B2 | 2/2015 | Chiproot |
| 9,103,476 B2 | 8/2015 | Geese et al. |
| 11,255,473 B2 | 2/2022 | Mitchell et al. |
| 2012/0205909 A1* | 8/2012 | Bird .................. F16L 21/08 |
| | | 285/337 |
| 2020/0141523 A1 | 5/2020 | Mitchell et al. |
| 2022/0136630 A1 | 5/2022 | Mitchell et al. |

OTHER PUBLICATIONS

Mitchell, Timothy J.; Final Office Action for U.S. Appl. No. 16/181,741, filed Nov. 6, 2018, dated Jul. 14, 2021, 12 pgs.
Mitchell, Timothy J.; Notice of Allowance for U.S. Appl. No. 16/181,741, filed Nov. 6, 2018, dated Dec. 8, 2021, 12 pgs.
Mitchell, Timothy J.; Requirement for Restriction/Election for U.S. Appl. No. 16/181,741, filed Nov. 6, 2018, dated Dec. 18, 2020, 9 pgs.
Mitchell, Timothy J.; Non-Final Office Action for U.S. Appl. No. 17/573,963, filed Jan. 12, 2022, dated Dec. 13, 2022, 25 pgs.
Mitchell, Timothy J.; Notice of Allowance for U.S. Appl. No. 17/573,963, filed Jan. 12, 2022, dated Mar. 23, 2023, 18 pgs.

* cited by examiner

END RING ASSEMBLY

CROSS-REFERENCE TO RELATED APPLICATIONS

The present application is a divisional of U.S. application Ser. No. 16/181,741, filed Nov. 6, 2018, which is hereby specifically incorporated by reference herein in its entirety.

TECHNICAL FIELD

This disclosure relates to the field of pipe couplings. More specifically, this disclosure relates to a gasket bridge comprising an anti-slip feature.

BACKGROUND

Common one-bolt pipe couplings can comprise an end ring and a gasket bridge. The pipe couplings can further comprise a gasket. The end ring can define a gap between opposing ends of the end ring, and the gasket bridge can bridge the gap to prevent the gasket from extruding through the gap during installation of the pipe coupling. However, the gasket bridge can shift during installation, resulting in liberation of the gasket and failure to seal the pipe coupling with a pipe component (e.g. a pipe). The shifting can be caused by sharp ends of the gasket bridge engaging the end ring as the pipe coupling is tensioned during installation.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a gasket bridge for an end ring assembly comprising an arcuate body defining an inner surface, an outer surface, a first bridge end, and a second bridge end, the arcuate body defining a bridge radius of curvature; a first ramp extending from the first bridge end; a second ramp extending from the second bridge end; and a projection extending from the inner surface.

Also disclosed is an end ring assembly comprising a split ring defining an outer ring surface, an inner ring surface, a first ring end and a second ring end, the first ring end and second ring end defining a gap therebetween; a gasket bridge defining an outer bridge surface, an inner bridge surface, the gasket bridge further defining a first bridge end, a second bridge end, and a middle portion therebetween, the middle portion of the gasket bridge extending between the first ring end and the second ring end, the first bridge end and second bridge end engaging the inner ring surface, a first ramp extending from the first bridge end; a primary gasket defining an primary outer sealing surface and a primary inner sealing surface, the primary outer sealing surface engaging the inner ring surface and the inner bridge surface.

Also disclosed is a method for using an end ring assembly, the method comprising the steps of bridging a gap a between a first ring end and a second ring end of a split ring with a gasket bridge, wherein the gasket bridge comprises a first ramp extending from a first bridge end and a second ramp extending from a second bridge end; positioning a gasket assembly against an inner split ring surface of the split ring and an inner bridge surface of the gasket bridge, the gasket assembly defining a void; engaging the gasket assembly with the first ramp and second ramp to prevent movement of the gasket assembly relative to the gasket bridge; receiving a pipe element within the void; and compressing the gasket assembly to seal the gasket assembly with the pipe element.

Additionally, disclosed is an end ring assembly comprising a split ring defining an outer ring surface, an inner ring surface, a first ring end and a second ring end, the first ring end and second ring end defining a gap therebetween; a gasket bridge defining an outer bridge surface, an inner bridge surface, the gasket bridge further defining a first bridge end, a second bridge end, and a middle portion therebetween, the middle portion of the gasket bridge extending between the first ring end and the second ring end, the first bridge end and second bridge end engaging the inner ring surface, a first ramp extending from the first bridge end; and a primary gasket defining a primary outer sealing surface and a primary inner sealing surface, the primary outer sealing surface engaging the inner ring surface and the inner bridge surface.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a gasket bridge and associated methods, systems, devices, and various apparatus. Example aspects of the gasket bridge can comprise an anti-slip feature. It would be understood by one of skill in the art that the disclosed gasket bridge is described in but a few exemplary aspects among many. No particular terminology or description should be considered limiting on the disclosure or the scope of any claims issuing therefrom.

Figure 1:
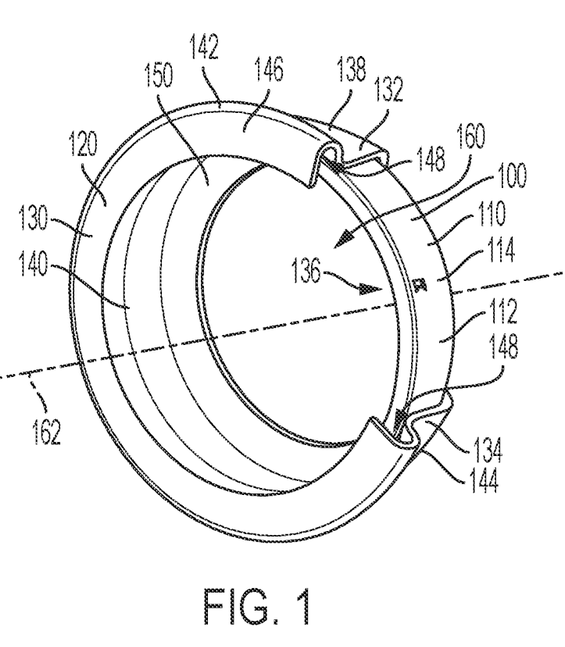
FIG. 1 is a perspective view of a gasket bridge engaged with an end ring, in accordance with one aspect of the present disclosure.

FIG. 1 illustrates a first aspect of a gasket bridge 100 according to the present disclosure. As shown, the gasket bridge 100 can define an arcuate body 110. Example aspects of the arcuate body 110 can be formed from a metal material, such as stainless steel. In other aspects, the arcuate body 110 can be formed from another metal material, plastic, or any other suitable material known in the art. According to example aspects, the gasket bridge 100 can be configured to engage an end ring 120. The end ring 120 can comprise a split ring 130, as shown. Example aspects of the split ring 130 can define a cross-sectional shape of a major section of a circle and can partially encircle a void 160. The split ring 130 can further define a first ring end 132 and a second ring end 134 spaced from the first ring end 132, such that a gap 136 is formed therebetween. Example aspects of the split ring 130 can be formed from a metal material, such as stainless steel; however, other aspects of the split ring 130 can be formed from any other suitable material known in the art, including, but not limited to, other metals and plastic.

Example aspects of the split ring 130 can define an outer surface 138 and an opposite inner surface 140, and the inner surface 140 can partially define the void 160. Moreover, as shown, a center axis 162 can extend through a center of the void 160. The split ring 130 can further define a first axial side 142 and a second axial side 144. A ring lip 146 can extend radially outward from the arcuate body 110 at the first axial side 142, and can define a substantially U-shaped cross-section, such that a groove 148 is defined therein. Example aspects of the ring lip 146 can extend around a circumference of the split ring 130 from the first ring end 132 to the second ring end 134. Furthermore, a ring shoulder 150 can extend radially inward from the arcuate body 110 at the second axial side 144, as shown. Example aspects of the ring shoulder 150 can extend around the circumference of the split ring 130 from the first ring end 132 to the second ring end 134.

Figure 4A:
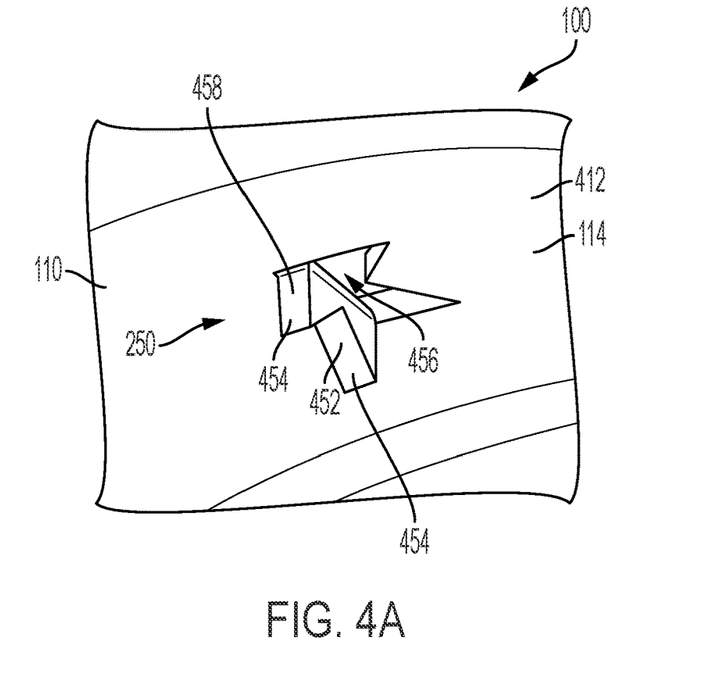
FIG. 4A is a detailed bottom perspective view of a second anti-slip feature of the gasket bridge of FIG. 1.

The arcuate body 110 of the gasket bridge 100 can define an outer surface 112 and an inner surface 412 (shown in FIG. 4A). The gasket bridge 100 can further define a pair of opposing end sections 212 (shown in FIG. 2) and a middle section 114 extending therebetween. The middle section 114 of the gasket bridge 100 can extend between the first ring end 132 and second ring end 134 to bridge the gap 136 therebetween, as shown. Example aspects of the gasket bridge 100 can define a length greater than a length of the gap 136, such that the end sections 212 of the gasket bridge 100 can overlap the first and second ring ends 132,134. Example aspects of the gasket bridge 100 and split ring 130 can define substantially the same radius of curvature. As such, the gasket bridge 100 and the split ring 130 together can define a substantially circular cross-sectional shape and can fully encircle the void 160. The end sections 212 of the gasket bridge 100 can engage the inner surface 140 of the split ring 130, as will be described in further detail below with reference to FIG. 5. Furthermore, in example aspects, the void 160 can be configured to allow fluid to flow therethrough, as will be described in further detail below.

Figure 2:
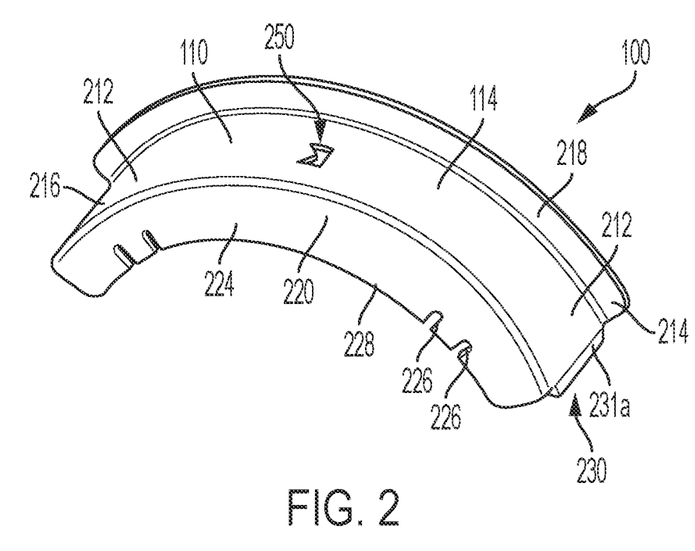
FIG. 2 is a top perspective view of the gasket bridge of FIG. 1.

FIG. 2 illustrates an example aspect of the gasket bridge 100, according to the present disclosure. The arcuate body 110 can define a first bridge end 214 and an opposite second bridge end 216. As shown, the end sections 212 of the arcuate body 110 can be oriented proximate to the first bridge end 214 and second bridge end 216, respectively, with the middle section 114 extending therebetween. The arcuate body 110 of the gasket bridge 100 can further define a first axial side 218 and an opposite second axial side 220. In example aspects, the arcuate body 110 can define a cross-sectional shape of a minor section of a circle. In other aspects, the arcuate body 110 can define a cross-sectional shape of a major section or a half section of a circle.

A first bridge shoulder 222 can extend radially outward from the first axial side 218 of the gasket bridge 100. According to example aspects, the first bridge shoulder 222 can extend along the length of the gasket bridge 100 from the first bridge end 214 to the second bridge end 216. Moreover, a second bridge shoulder 224 can extend radially inward from the second axial side 220 of the gasket bridge 100 and can extend along the length of the gasket bridge 100 from the first bridge end 214 to the second bridge end 216. As shown, in example aspects, the second bridge shoulder 224 can comprise one or more slots 226 formed therein. The slots 226 can extend radially outward from a radially inward end 228 of the first bridge shoulder 222. The slots 226 can be configured to prevent buckling of the gasket bridge 100 during manufacturing and/or when the gasket bridge 100 is under tension in a tensioned configuration 802 (tensioned configuration 802 shown in FIG. 8).

Figure 4B:
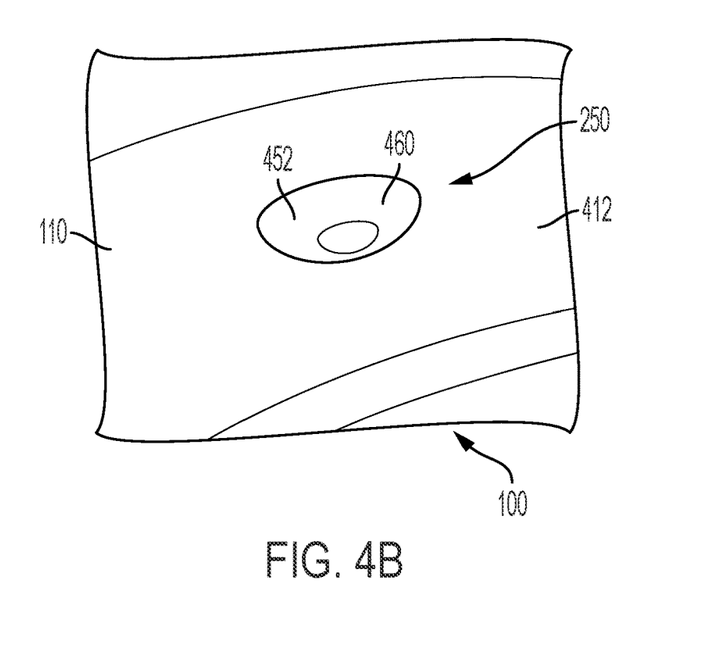
FIG. 4B is a detailed bottom perspective view of the second anti-slip feature, according to another aspect of the present disclosure.
Figure 5:
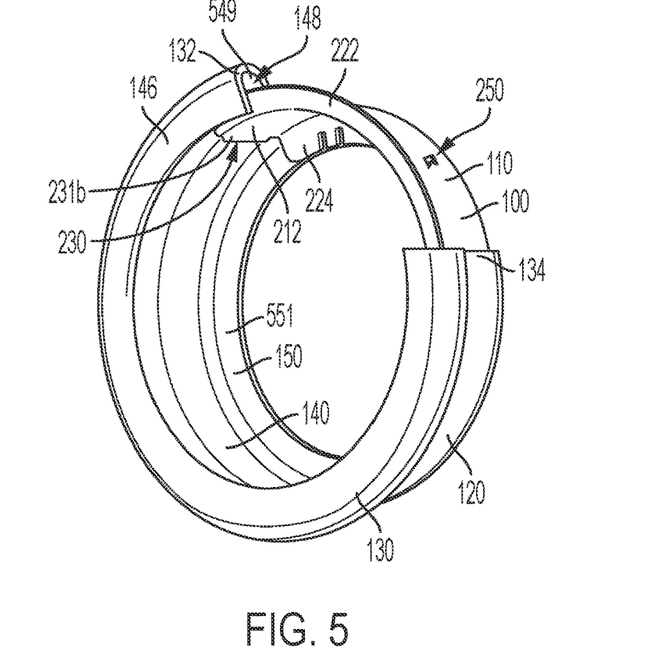
FIG. 5 is a perspective view of the gasket bridge of FIG. 1 engaged with the end ring of FIG. 1.

Example aspects of the gasket bridge 100 can further comprise a first anti-slip feature 230 comprising a pair of ramps 231a,b (ramp 231b shown in FIG. 5). The ramp 231a can extend from the first bridge end 214 and the ramp 231b can extend from the second bridge end 216. Furthermore, example aspects of the gasket bridge 100 can comprise a second anti-slip feature 250 oriented at the middle section 114 of the arcuate body 110. The second anti-slip feature 250 can comprise a projection 452 (shown in FIG. 4). Other example aspects of the gasket bridge 100 can comprise only one of the first and second anti-slip features 230,250. The first anti-slip feature 230 is described in further detail below with reference to FIGS. 3A-3B, and the second anti-slip feature 250 is described in further detail below with reference to FIGS. 4A-4B.

Figure 3A:
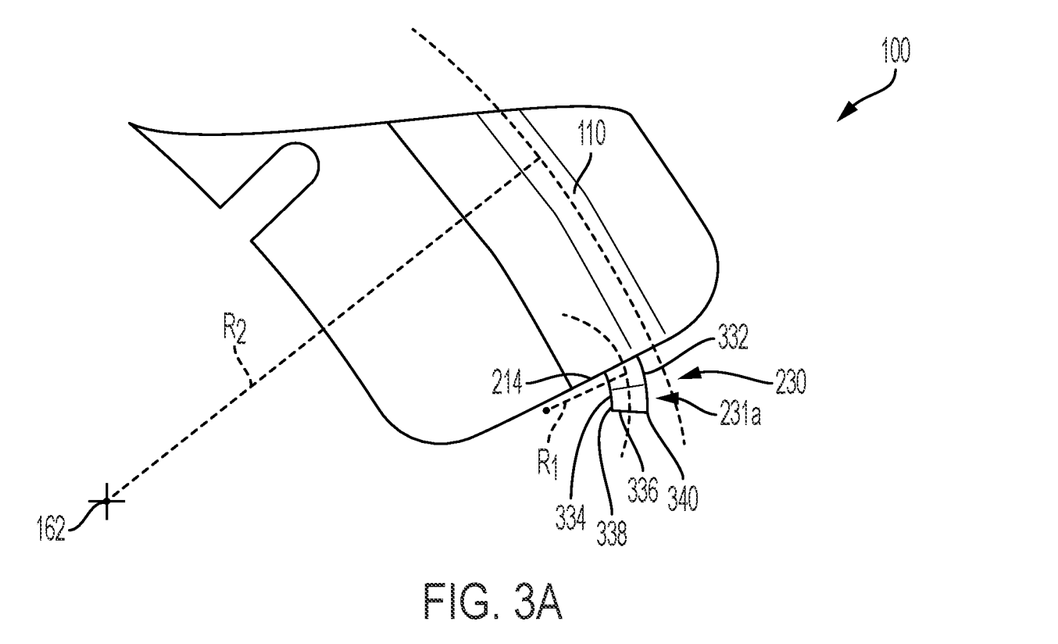
FIG. 3A is a detailed front view of a first anti-slip feature of the gasket bridge of FIG. 1.

FIG. 3 is a detailed side view of the ramp 231a of the first anti-slip feature 230. Example aspects of the ramp 231b can be substantially the same as the ramp 231a. As illustrated, the ramp 231a can define a smooth, curved upper surface 332 and a smooth, curved lower surface 334 opposite the upper surface 332. An end wall 336 can extend between the upper surface 332 and lower surface 334 distal from the first bridge end 214 of the gasket bridge 100, as shown. In example aspects, the intersection of the lower surface 334 and end wall 336 can define a lower edge 338, and the intersection of the upper surface 332 and the end wall 336 can define an upper edge 340. In some example aspects, as shown, the upper edge 340 and lower edge 338 can each define a sharp edge. In other aspects, however, one or both of the upper edge 340 and lower edge 338 can define a soft edge (e.g., a curved edge). Furthermore, the ramp 231a can curve slightly radially inward relative to the axis 162. As such, the radius of curvature R1 of the ramp 231a can be smaller than a radius of curvature R2 of the arcuate body 110, as illustrated.

Figure 3B:
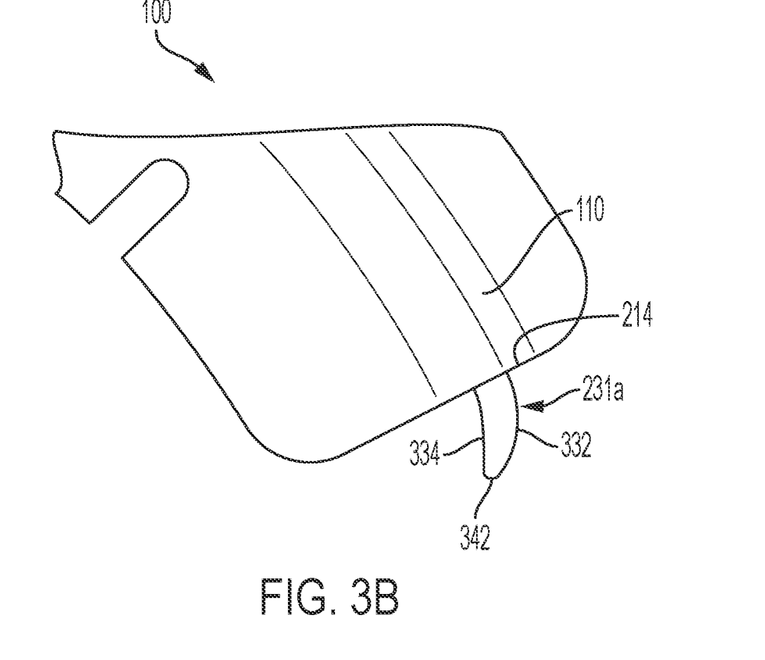
FIG. 3B is a detailed front view of the first anti-slip feature, according to another aspect of the present disclosure.

In another aspect of the ramp 231a, as shown in FIG. 3B, the upper surface 332 of the ramp 231a can taper towards the lower surface 334 of the ramp 231a, such that a single edge 342 can be defined distal from the first bridge end 214 of the arcuate body 110. Thus, such an aspect of the ramp 231a may not comprise the end wall 336 (shown in FIG. 3A). Example aspects of the single edge 342 can be a soft edge, as shown in FIG. 3B, or a sharp edge, as shown described with respect to FIG. 3A.

FIG. 4A is a detailed side view of the second anti-slip feature 250. The second anti-slip feature 250 can be oriented at the middle section 114 of the arcuate body 110. Example aspects of the second anti-slip feature 250 can define a projection 452 extending radially inward from the inner surface 412 of the arcuate body 110. In one example aspect, as shown, the projection 452 can define a pair of prongs 454. In some aspects, the prongs 454 can define a v-shaped gap therebetween. Other aspects of the projection 452 can define fewer or additional prongs 454. The projection 452 can be oriented substantially orthogonal relative to the inner surface 412 of the arcuate body 110; however, in other aspects, the projection 452 can be oriented at an obtuse or acute angle relative to the inner surface 412. As shown, in example aspects, the projection 452 can be stamped (e.g., punched) from the arcuate body 110 of the gasket bridge 100. For example, a hole 456 can be punched in the arcuate body 110, with a slug 458 formed by the punch remaining attached to the arcuate body 110. The slug 458 can be bent relative to the arcuate body 110 to form the projection 452, as shown.

FIG. 4B illustrates a second aspect of the second anti-slip feature 250, according to the present disclosure. In this aspect, the projection 452 can define a hemispherical bump 460 formed on the inner surface 412 of the arcuate body 110 and extending radially inward relative to the axis 162 (shown in FIG. 1). In the current aspect, the bump 460 can be formed by indenting the outer surface 112 (shown in FIG. 1) of the arcuate body 110, such that material of the arcuate body 110 is forced radially inward. In other aspects, the projection 452 can be formed by any other suitable method of manufacturing known in the art, such as extruding. Furthermore, in other aspects, the projection 452 can define another shape, such as, for example, cone, tetrahedron, triangular prism, cuboid, square pyramid, or any other suitable shape known in the art.

FIG. 5 illustrates another perspective view of the gasket bridge 100 engaged with the end ring 120. The end sections 212 of the gasket bridge 100 can extend beyond the first and second ring ends 132,134 and can engage the inner surface 140 of the end ring 120 proximate the first and second ring ends 132,134. Furthermore, the first bridge shoulder 222 of the gasket bridge 100 can extend radially outward into the groove 148 of the ring lip 146, and in example aspects, can abut an inner sidewall 549 of the groove 148. Additionally, the second bridge shoulder 224 of the gasket bridge 100 can abut an inner surface 551 of the ring shoulder 150, as shown.

Moreover, the ramps 231a,b (ramp 231a shown in FIG. 2) of the first anti-slip feature 230 can curve radially inward, such that the end wall 336 (shown in FIG. 3A) of each ramp 231a,b can be out of contact with the inner surface 140 of the split ring 130. Thus, in such an aspect, neither the lower edge 338 nor the upper edge 340 (upper and lower edges 338,340 shown in FIG. 3A) of the ramps 231a,b can engage and dig into the split ring 130. Furthermore, the projection 452 (shown in FIG. 4A) of the second anti-slip feature 250 can be oriented between the first ring end 132 and second ring end 134 when the gasket bridge 100 is engaged with the end ring 120. The projection 452 can extending radially inward, such that the projection 452 can be out of contact with the split ring 130.

Figure 6A:
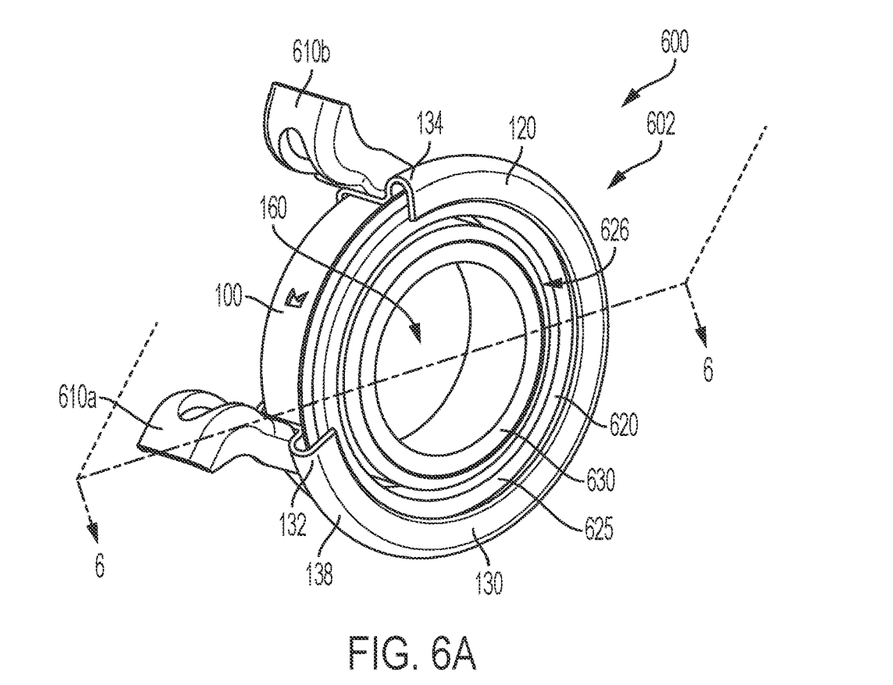
FIG. 6A is a perspective view of an end ring assembly, according to an aspect of the present disclosure, comprising the gasket bridge of FIG. 1, the end ring of FIG. 1, and a gasket assembly.

FIG. 6A illustrates an example aspect of an end ring assembly 600. Example aspects of the end ring assembly 600 can be coupled to a pipe 730 (shown in FIG. 7C), or another piping component. As shown, the end ring assembly 600 can comprise the end ring 120 and the gasket bridge 100, as described above. Example aspects of the end ring assembly 600 can also comprise a pair of fastener bases 610a,b extending radially outward from the end ring 120, relative to the axis 162. The fastener base 610a can extend from the outer surface 138 of the split ring 130 proximate the first ring end 132, and the fastener base 610b can extend from the outer surface 138 of the split ring 130 proximate the second ring end 134.

The end ring assembly 600 can further comprise a gasket assembly 625. Example aspects of the gasket assembly 625 can comprise an annular primary gasket 620. The primary gasket 620 can be received within the void 160 and can be configured to engage the inner surface 140 of the split ring 130 (inner surface 140 shown in FIG. 1) and the inner surface 412 of the gasket bridge 100 (inner surface 412 shown in FIG. 4A). Some aspects of the gasket assembly 625 can further comprise a secondary gasket 630. The secondary gasket 630 can be received within the void 160 and can be configured to engage the primary gasket 620, as shown. Example aspects of the secondary gasket 630 can be selectively removed from and added to the end ring assembly 600 for optional use, as will be described in further detail below. The primary and secondary gaskets 620,630 can be formed from a resilient material, such as, for example, neoprene. In other aspects, the primary and secondary gaskets 620,630 can be formed from another suitable material known in art, including, but not limited to, other rubbers, sealants, glues, membranes, and resins.

Figure 8:
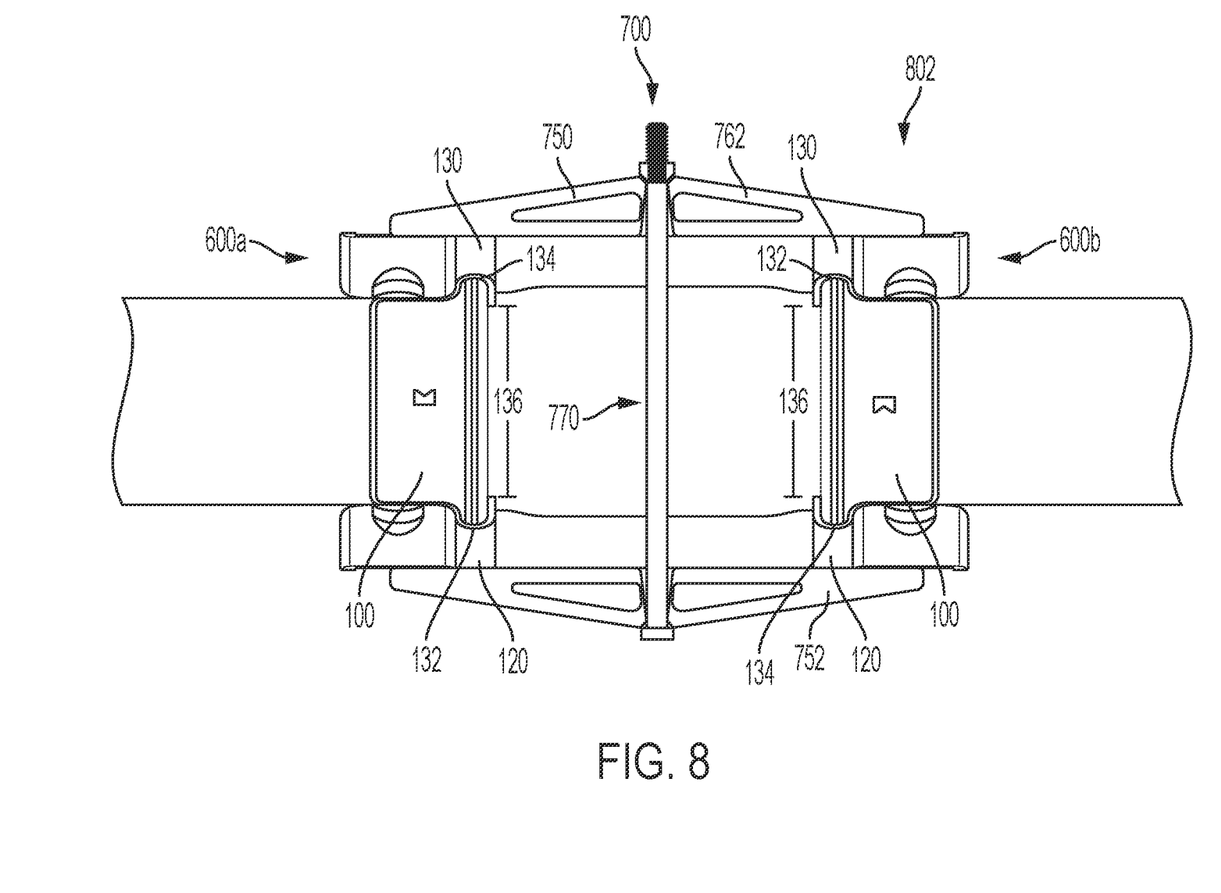
FIG. 8 is a top view of the pipe coupling of FIG. 7 in a tensioned configuration.

Furthermore, example aspects of the end ring assembly 600 can be configurable in a relaxed configuration 602, as shown in FIGS. 6A, wherein the primary gasket 620 and secondary gasket 630 can be uncompressed, and a tensioned configuration 802, as shown in FIG. 8, wherein the primary gasket 620 and secondary gasket 630 can be compressed. Example aspects of the split ring 130 can be formed from a resilient material, which can bias the end ring assembly 600 to the relaxed configuration 602, and which can be resiliently deformed in the tensioned configuration 802.

Figure 6B:
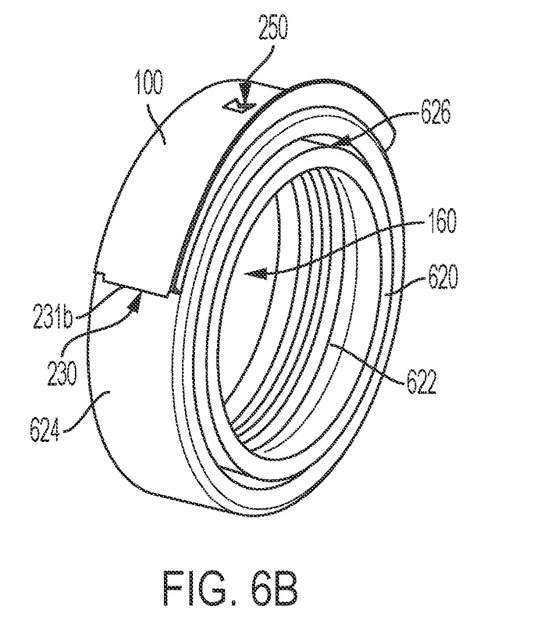
FIG. 6B is a perspective view of the gasket bridge of FIG. 1 engaged with a primary gasket of the gasket assembly of FIG. 6A.

FIG. 6B illustrates a perspective view of the primary gasket 620 of the gasket assembly 625 (shown in FIG. 6A) engaged with the gasket bridge 100. As shown, the primary gasket 620 can comprise an inner sealing surface 622 and an outer sealing surface 624. The outer sealing surface 624 can be configured to engage the inner surface 412 (shown in FIG. 4A) of the gasket bridge 100 and the inner surface 140 of the split ring 130 (split ring 130 shown in FIG. 1). As such, the inner sealing surface 622 can define the void 160 of the end ring assembly 600 (shown in FIG. 6A) in aspects where the secondary gasket 630 (shown in FIG. 6A) is removed. According to example aspects, the ramps 231a,b (231a shown in FIG. 2) of the first anti-slip feature 230 can be curved radially inward towards the outer sealing surface 624 of the primary gasket 620, such that the ramps 231a,b can contact and dig into the outer sealing surface 624 in the tensioned configuration 802 (shown in FIG. 8) of the end ring assembly 600. Furthermore, the projection 452 (shown in FIG. 4) of the second anti-slip feature 250 can extend radially inward towards the outer sealing surface 624 of the primary gasket 620 and can contact and dig into the outer sealing surface 624 of the primary gasket 620 in the tensioned configuration 802. According to example aspects, the ramps 231a,b and the projection 452 may or may not dig into the outer sealing surface 624 in the relaxed configuration 602 (shown in FIG. 6A).

Example aspects of the primary gasket 620 can further comprise one or more annular grooves 626 formed between the outer sealing surface 624 and inner sealing surface 622, as shown. In example aspects, fluid flowing through the end ring assembly 600 can be forced into the groove 626 of the primary gasket 620. In aspects of the end ring assembly 600 not comprising the secondary gasket 630, the inner sealing surface 622 of the primary gasket 620 can engage one of the pipes 730 (shown in FIG. 7C) received in the void 160. The fluid pressure of the fluid forced into the groove 626 can aid in forcing the outer sealing surface 624 of the primary gasket 620 against the inner surfaces 140,412 of the split ring 130 and gasket bridge 100, respectively, and in forcing the inner sealing surface 622 of the primary gasket 620 against the pipe 730 for an improved seal.

Figure 6C:
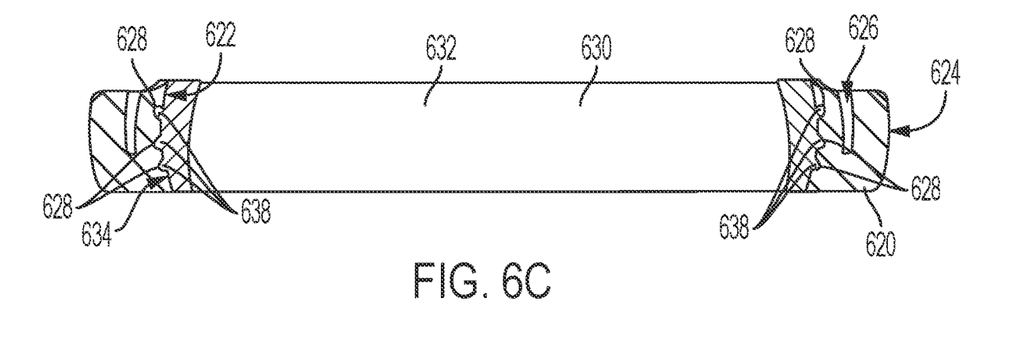
FIG. 6C is a cross-sectional view of the primary gasket of FIG. 6B engaged with a secondary gasket of the gasket assembly of FIG. 6A, taken along line 6-6 in FIG. 6A.

FIG. 6C illustrates a cross-section view of the secondary gasket 630 engaged with the primary gasket 620. In aspects of the end ring assembly 600 comprising the secondary gasket 630, the inner sealing surface 622 of the primary gasket 620 can engage an outer sealing surface 634 of the secondary gasket 630, and an inner sealing surface 632 of the secondary gasket 630 can define the void 160 (shown in FIG. 1) and can engage one of the pipes 730 (shown in FIG. 7C). Thus, the fluid pressure of fluid received in the groove 626 can force the outer sealing surface 624 of the primary gasket 620 against the inner surfaces 140,412 of the split ring 130 and the gasket bridge 100 (split ring 130 and gasket bridge 100 shown in FIG. 1), the inner sealing surface 622 of the primary gasket 620 against the outer sealing surface 634 of the secondary gasket 630, and the inner sealing surface 632 of the of the secondary gasket 630 against the pipe 730 received in the void 160. Furthermore, as shown, example aspects of the inner sealing surface 622 of the primary gasket 620 can define one or more annular grooves 628 configured for engaging one or more annular flanges 638 formed on the outer sealing surface 634 of the secondary gasket 630 for an improved grip between the primary and secondary gaskets 620,630.

Figure 7A:
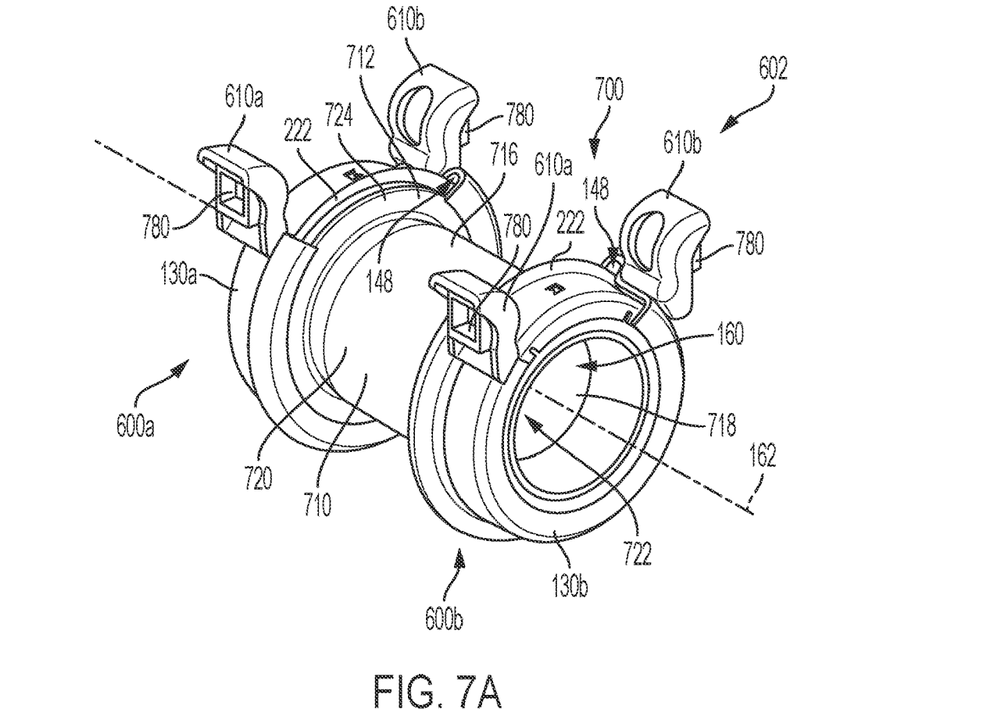
FIG. 7A is a perspective view of a pipe coupling in a relaxed configuration comprising a pair of the end ring assemblies of FIG. 6 and a coupling body, in accordance with an aspect of the present disclosure.
Figure 7B:
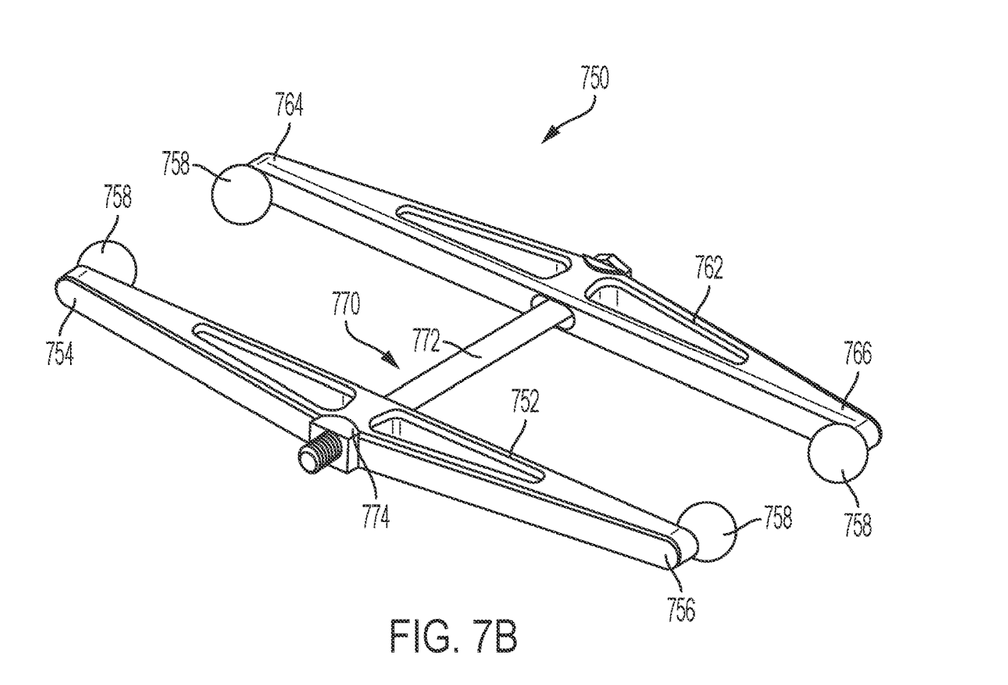
FIG. 7B is a top perspective view of a fastener assembly, in accordance with an aspect of the present disclosure.
Figure 7C:
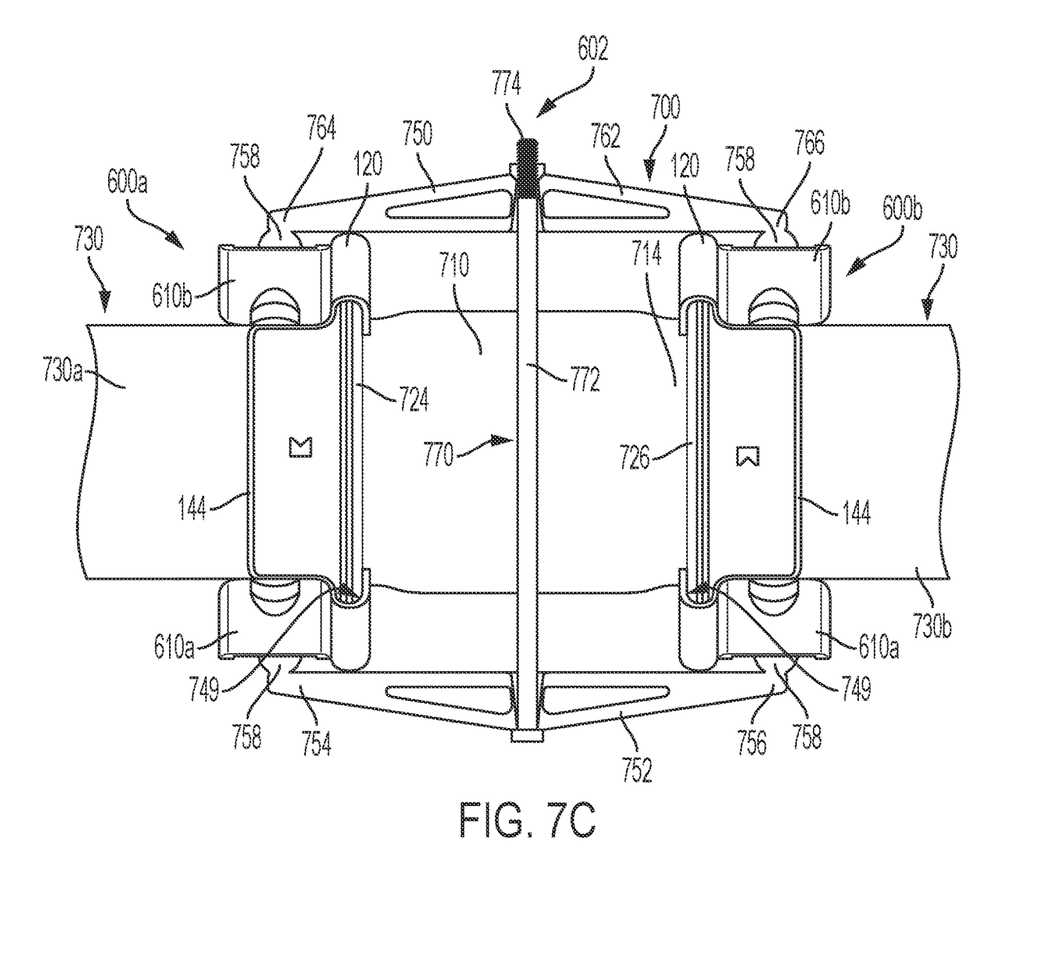
FIG. 7C is a top view of the pipe coupling of FIG. 7 in the relaxed configuration and engaged with a pair of pipes.

FIGS. 7A and 7C illustrate a pipe coupling 700 in the relaxed configuration 602, according to an example aspect of the present disclosure. Example aspects of the pipe coupling 700 can be used for coupling together a pair of the pipes 730 (shown in FIG. 7C) and allowing fluid to flow between the pipes 730, as will be described in further detail below. As shown, the pipe coupling 700 can comprise a pair of the end ring assemblies 600a,b and a coupling body 710 extending therebetween. The coupling body 710 can define a substantially tubular structure defining a first body end 712, an opposite second body end 714 (shown in FIG. 7C), and a mid-section 716 therebetween. The coupling body 710 further can define an inner surface 718 and an outer surface 720, and the inner surface 718 can define a bore 722 extending therethrough from the first body end 712 to the second body end 714. As shown, the axis 162 can extend through a center of the bore 722 and the bore 722 can be in fluid communication with the void 160 of each of the end ring assemblies 600a,b.

A first flange 724 can extend radially outward from the first body end 712 and a second flange 726 (shown in FIG. 7C) can extend radially outward from the second body end 714. According to example aspects, the first flange 724 can be received in the groove 148 of the split ring 130a and the second flange 726 can be received in the groove 148 of the split ring 130b to couple the coupling body 710 to the pair of end ring assemblies 600a,b. Furthermore, as shown, each of the first and second flanges 724,726 can be positioned between the corresponding first bridge shoulder 222 and an outer sidewall 749 (shown in FIG. 7C) of the groove 148.

Moreover, each of the fastener bases 610a,b of each of the end ring assemblies 600a,b can comprise a socket 780, as shown. Example aspects of the sockets 780 can be configured to engage a fastener assembly 750 (shown in FIG. 7B) for coupling the end ring assemblies 600a,b together and for selectively tensioning and relaxing the end ring assemblies 600a,b.

FIG. 7B illustrates an example aspect of the fastener assembly 750 configured for connecting the end ring assemblies 600a,b (shown in FIG. 7A) together. Some aspects of the fastener assembly 750 can be substantially similar to the fastener assembly shown in U.S. application Ser. No. 15/649,015, filed Jul. 13, 2017, now U.S. Pat. No. 10,844,983, which is hereby specifically incorporated by reference herein in its entirety. Example aspects of the fastener assembly 750 can comprise a first bar 752 and a second bar 762. The first bar 752 can define a first end 754 and a second end 756. Similarly, the second bar 762 can define a first end 764 and a second end 766. Furthermore, each of the first ends 754,764 and second ends 756,766 can define a ball 758. In example aspects, as shown, the first bar 752 and second bar 762 can be oriented substantially parallel to one another.

The fastener assembly 750 can further comprise a fastener 770 for coupling the first bar 752 to the second bar 762. As shown, the fastener 770 can extend between the first and second bar 762 at about a midpoint of each of the first bar 752 and second bar 762. Thus, according to example aspects, the fastener assembly 750 can substantially define an H-shape. According to example aspects, the fastener 770 can comprise a bolt 772 extending between the first and second bars 752,762 and a nut 774 for securing the bolt 772 to the first and second bars 752,762. As the nut 774 is tightened on the bolt 772, the first and second bars 752,762 can be drawn closer together, and as the nut 774 is loosened on the bolt 772, the first and second bars 752, 762 can be pushed apart.

FIG. 7C illustrates the fastener assembly 750 coupled to the pipe coupling 700. The ball 758 (shown in FIG. 7B) of the first end 754 of the first bar 752 can engage the socket 780 (shown in FIG. 7A) of the fastener base 610a of the end ring assembly 600a, and the ball 758 of the second end 756 can engage the socket 780 of the fastener base 610a of the end ring assembly 600b. The second bar 762 can engage the fastener bases 610b of the end ring assemblies 600a,b in the same manner. As such, each of the first and second bars 752,762 can extend between each of the end ring assemblies 600a,b, and, in example aspects, as shown, can be oriented substantially parallel to one another. As described above, as the nut 774 is tightened on the bolt 772, the first and second bars 752,762 can be drawn closer together, tensioning the end rings 120 of the end ring assemblies 600a,b, as will be described in further detail below. In the relaxed configuration 602, as shown, the fastener 770 can be in a loosed state (e.g., the nut 774 can be removed or minimally tightened on the bolt 772), such that tension in the end ring assemblies 600a,b is absent or minimal, and the corresponding gasket assemblies 625 can be uncompressed or minimally compressed. In an alternative aspect of the fastener assembly 750, each of the end ring assemblies 600a,b can comprise a fastener 770 for directly coupling the corresponding fastener bases 610a,b together, such that each of the end ring assemblies 600a,b can be selectively tensioned and relaxed individually.

Furthermore, as shown in FIG. 7C, the pipe coupling 700 can be coupled to the pair of pipes 730. However, in other aspects, other piping components can be coupled to the pipe coupling 700, such as, for example, elbows, tees, valves, caps, or any other suitable piping component known in the art. In the present aspect, a first one of the pipes 730a can be coupled to the end ring assembly 600a, and a second one of the pipes 730b can be coupled to the end ring assembly 600b. An end of each pipe 730a,b can be inserted into the void 160 (shown in FIG. 6A)) of the corresponding end ring assembly 600a,b at the second axial side 144 of the corresponding split ring 130. In aspects wherein one or both of the pipes 730a,b define a small diameter, the secondary gasket 630 (shown in FIG. 6A) can be added to the corresponding end ring assembly 600a,b to reduce the diameter of the void 160, and the inner sealing surface 632 (shown in FIG. 6C) of the secondary gasket 630 can engage the corresponding pipe 730a,b. In aspects wherein one or both of the pipes 730a,b define a large diameter, the secondary gasket 630 can be removed from the corresponding end ring assembly 600a,b to increase the diameter of the void 160, and the inner sealing surface 622 (shown in FIG. 6B) of the primary gasket 620 (shown in FIG. 6A) can engage the corresponding pipe 730a,b.

FIG. 8 illustrates the pipe coupling 700 in the tensioned configuration 802. As shown, each of the split rings 130 of the end ring assemblies 600a,b can be constricted to the tensioned configuration 802 by tightening the fastener 770. Tightening the fastener 770 can draw the first and second bars 752,762 of the fastener assembly 750 towards one another, in turn drawing the first and second ring ends 132,134 of each of the split rings 130 towards one another. Drawing the first end second ring ends 132,134 of the split rings 130 together can reduce the corresponding gap 136 between the first and second ring ends 132,134 and can reduce the overall diameter of each split ring 130. Constricting the split rings 130 in this manner can compress the corresponding primary gasket 620 (shown in FIG. 6A) (and the secondary gasket 630 (shown in FIG. 6A), if present), such that the outer sealing surface 624 (shown in FIG. 6B) of the primary gasket 620 can form a seal with the gasket bridge 100 and the end ring 120, and such that the inner sealing surface 622 (shown in FIG. 6B) of the primary gasket 620 (or inner sealing surface 632 of the secondary gasket 630, if present) can form a seal with the corresponding pipe 730 (shown in FIG. 7C). Furthermore, as the split rings 130 are constricted, the ramps 231a,b (shown in FIG. 2) and the projection 452 (shown in FIG. 4A) of the corresponding gasket bridge 100 can be pushed into the outer sealing surface 624 of the primary gasket 620. The engagement of the ramps 231a,b and the projection 452 with the primary gasket 620 can prevent the primary gasket 620 from rotating and/or slipping relative to the end ring 120 and the gasket bridge 100.

Thus, a method for installing the end ring assembly 600 can comprise bridging the gap 136 between the first and second ring ends 132,134 of the split ring 130 with the gasket bridge 100, wherein the gasket bridge 100 comprises the first ramp 231a extending from the first bridge end 214 and the second ramp 231b extending from the second bridge end 216. Some aspects of the gasket bridge 100 can additionally comprise the projection 452 extending from the middle section 114. The method can further comprise positioning the gasket assembly 625 against the inner surfaces 140,412 of the split ring 130 and gasket bridge 110, respectively, and engaging the gasket assembly 625 with the ramps 231a,b of the first anti-slip feature 230 and/or projection 452 of the second anti-slip feature 250 to prevent axial and/or rotational movement of the gasket assembly 625 relative to the gasket bridge 110. Example aspects of the method can also comprise engaging the coupling body 710 with the ring lip 146 of the split ring 130. Some example aspects can also comprise engaging the pipe 730 (or other piping component) with the gasket assembly 625.

Figure 9:
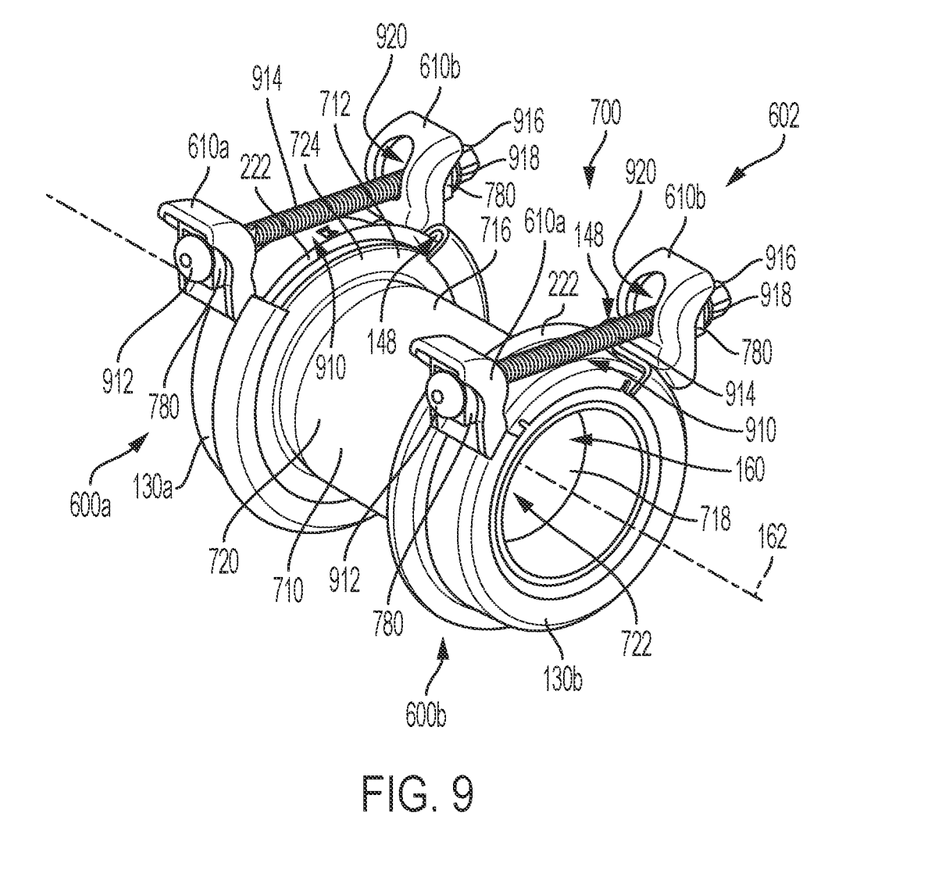
FIG. 9 is a perspective view of pipe coupling of FIG. 7A and pair of fasteners, in accordance with another aspect of the present disclosure.

FIG. 9 illustrates another example aspect of the pipe coupling 700. As shown, a fastener, such as a bolt 910, can extend through each corresponding pair of fastener bases 610a,b and sockets 780. Openings 920 can be formed through each of the fastener bases 610a,b and sockets 780 through which the bolt 910 can pass. According to example aspects, each of the bolts 910 can define a dome-shaped head end 912 and a threaded tail end 914. Furthermore, example aspects can comprise a nut 916 for securing the bolt 910 to the corresponding end ring assembly 600. As the nut 916 is tightened on the threaded tail end 914 of the corresponding bolt 910, the corresponding fastener bases 610a,b can be drawn closer together, constricting the corresponding split ring 130, and thereby compressing the corresponding gasket assembly 625 (shown in FIG. 6A).

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An end ring assembly for a pipe coupling comprising:
a split ring defining an outer ring surface, an inner ring surface, a first ring end and a second ring end, the first ring end and second ring end defining a gap therebetween, the split ring partially encircling an interior void for receiving a piping component;
a gasket bridge defining an outer bridge surface, an inner bridge surface, the gasket bridge further defining a first circumferential bridge end, a second circumferential bridge end, and a middle portion therebetween, the middle portion of the gasket bridge extending between the first ring end and the second ring end to encircle the interior void, the first circumferential bridge end and the second circumferential bridge end engaging the inner ring surface, a ramp extending from the first circumferential bridge end, the ramp extending away from the split ring and radially inward into the interior void; and
a primary gasket disposed within the interior void and defining a primary outer sealing surface and a primary inner sealing surface, the primary outer sealing surface engaging the inner ring surface and the inner bridge surface, wherein the ramp presses radially inward against the primary outer sealing surface to retain the primary gasket within the interior void
wherein:
the gasket bridge defines an arcuate body that arcs from the first circumferential bridge end to the second circumferential bridge end;
the gasket bridge further defines a first axial side and a second axial side;
the arcuate body defines a length from the first circumferential bridge end to the second circumferential bridge end and a width from the first axial side to the second axial side; and
the length is greater than the width.

2. The end ring assembly of claim 1, wherein the end ring assembly further comprises a first fastener base extending from the first ring end, a second fastener base extending from the second ring end.

3. The end ring assembly of claim 2, further comprising a fastener received through each of the first fastener base and the second fastener base, wherein the end ring assembly is configurable in a tensioned configuration and a relaxed configuration, the fastener loosened in the relaxed configuration and tightened in the tensioned configuration.

4. The end ring assembly of claim 1, wherein the end ring assembly is configurable in a relaxed configuration, wherein the primary gasket is un-compressed, and a tensioned configuration, wherein the primary gasket is compressed within the interior void by the split ring and the gasket ring.

5. The end ring assembly of claim 1, further comprising a secondary gasket disposed within the interior void, the secondary gasket defining a secondary outer sealing surface and a secondary inner sealing surface, the secondary outer sealing surface configured for engaging the primary inner sealing surface, and the secondary inner sealing surface configured for engaging a piping component.

6. The end ring assembly of claim 5, wherein the secondary gasket is selectively removable from the end ring assembly.

7. The end ring assembly of claim 5, wherein:
the primary inner sealing surface defines an annular engagement groove;
the secondary outer sealing surface defines an annular engagement flange; and
the annular engagement flange engages the annular engagement groove to improve a grip between the primary gasket and the secondary gasket.

8. The end ring assembly of claim 1, wherein the ramp is a first ramp, the gasket bridge further defines a second ramp extending from the second circumferential bridge end, and the second ramp presses radially inward against the primary outer sealing surface of the primary gasket.

9. The end ring assembly of claim 1, wherein the gasket bridge defines a bridge curvature from the first circumferential bridge end to the second circumferential bridge end, and the first ramp defines a first ramp curvature that is smaller than the bridge curvature.

10. The end ring assembly of claim 1, further comprising a projection extending from the inner bridge surface at the middle portion of the gasket bridge, the projection extending into the interior void and pressing inward against the primary outer sealing surface of the primary gasket.

11. The end ring assembly of claim 10, wherein:
the middle portion of the gasket bridge defines a hole and a slug; and
the slug is bent radially inward relative to the hole to define the projection.

12. The end ring assembly of claim 11, wherein slug defines a pair of prongs and a substantially V-shaped gap formed between the pair of prongs, each of the prongs digging into the outer sealing surface.

13. The end ring assembly of claim 1, wherein the gasket bridge further comprises a bridge shoulder extending radially inward from the first axial side, the split ring defines a ring shoulder extending radially inward from a first axial side of the split ring, and the bridge shoulder abuts an inner surface of the ring shoulder.

14. The end ring assembly of claim 13, wherein the bridge shoulder defining a slot extending radially outward from a radially inward edge of the bridge shoulder, the slot configured to prevent the gasket bridge from buckling.

15. The end ring assembly of claim 13, wherein the primary gasket abuts each of the ring shoulder and the bridge shoulder.

16. The end ring assembly of claim 1, wherein the split ring comprises a ring lip having a substantially U-shaped cross-section and extending circumferentially around the split ring, and wherein the ring lip defining a ring groove.

17. The end ring assembly of claim 16, wherein the gasket bridge comprises a bridge shoulder extending radially outward from a first axial side of the gasket bridge, the bridge shoulder engaging the ring groove.

18. The end ring assembly of claim 10, wherein the projection defines a substantially hemispherical bump.

19. An end ring assembly for a pipe coupling comprising:
a split ring defining an outer ring surface, an inner ring surface, a first ring end and a second ring end, the first ring end and second ring end defining a gap therebetween, the split ring partially encircling an interior void for receiving a piping component;
a gasket bridge defining an outer bridge surface, an inner bridge surface, the gasket bridge further defining a first circumferential bridge end, a second circumferential bridge end, and a middle portion therebetween, the middle portion of the gasket bridge extending between the first ring end and the second ring end to encircle the interior void, the first circumferential bridge end and the second circumferential bridge end engaging the inner ring surface, a ramp extending from the first circumferential bridge end, the ramp extending away from the split ring and radially inward into the interior void;
a primary gasket disposed within the interior void and defining a primary outer sealing surface and a primary inner sealing surface, the primary outer sealing surface engaging the inner ring surface and the inner bridge surface, wherein the ramp presses radially inward against the primary outer sealing surface to retain the primary gasket within the interior void; and
a secondary gasket disposed within the interior void, the secondary gasket defining a secondary outer sealing surface and a secondary inner sealing surface, the secondary outer sealing surface configured for engaging the primary inner sealing surface, and the secondary inner sealing surface configured for engaging a piping component.

20. An end ring assembly for a pipe coupling comprising:
a split ring defining an outer ring surface, an inner ring surface, a first ring end and a second ring end, the first ring end and second ring end defining a gap therebetween, the split ring partially encircling an interior void for receiving a piping component;
a gasket bridge defining an outer bridge surface, an inner bridge surface, the gasket bridge further defining a first circumferential bridge end, a second circumferential bridge end, and a middle portion therebetween, the middle portion of the gasket bridge extending between the first ring end and the second ring end to encircle the interior void, the first circumferential bridge end and the second circumferential bridge end engaging the inner ring surface, a ramp extending from the first circumferential bridge end, the ramp extending away from the split ring and radially inward into the interior void;
a primary gasket disposed within the interior void and defining a primary outer sealing surface and a primary inner sealing surface, the primary outer sealing surface engaging the inner ring surface and the inner bridge surface, wherein the ramp presses radially inward against the primary outer sealing surface to retain the primary gasket within the interior void; and
a projection extending from the inner bridge surface at the middle portion of the gasket bridge, the projection extending into the interior void and pressing inward against the primary outer sealing surface of the primary gasket, wherein:

the middle portion of the gasket bridge defines a hole and a slug; and the slug is bent radially inward relative to the hole to define the projection.

\* \* \* \* \*